July 13, 1954      W. A. GEYGER      2,683,843
MAGNETIC SERVO AMPLIFIER WITH DIRECT CURRENT DAMPING
Filed July 20, 1953
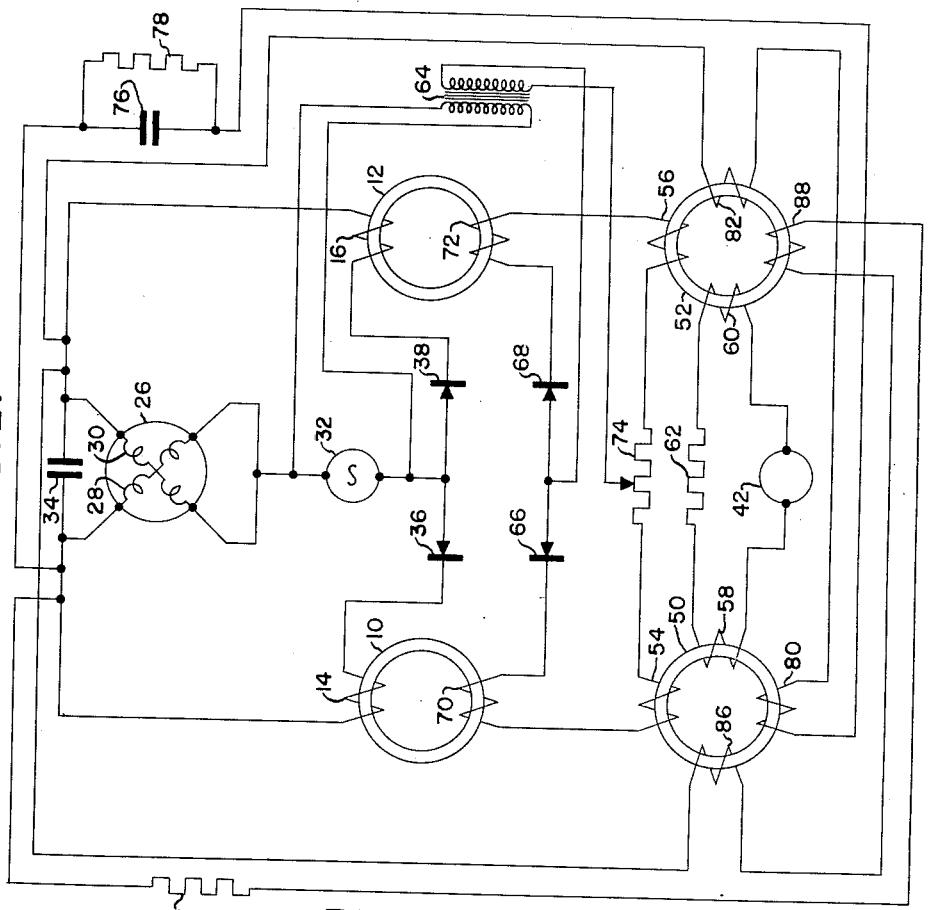
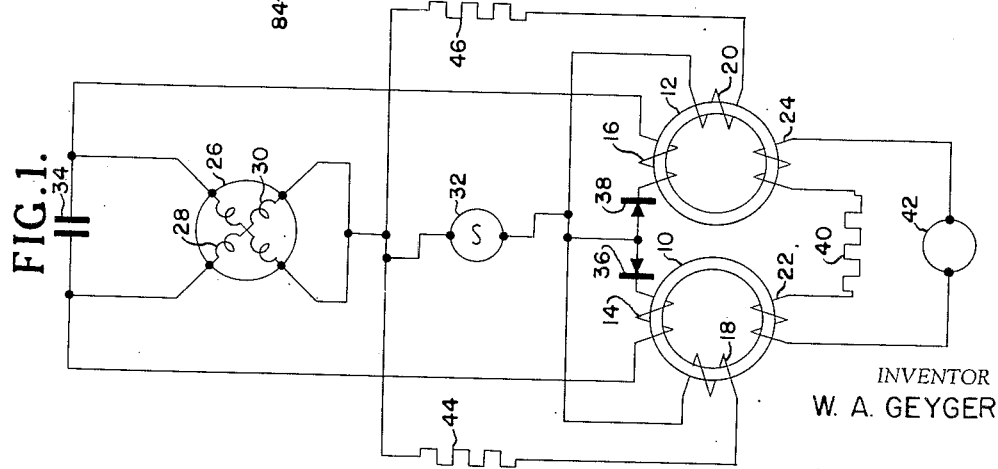
INVENTOR
W. A. GEYGER
BY
ATTORNEYS Patented July 13, 1954

2,683,843

UNITED STATES PATENT OFFICE 2,683,843

MAGNETIC SERVO AMPLIFIER WITH DIRECT CURRENT DAMPING

Wilhelm A. Geyger, Takoma Park, Md., assignor to the United States of America as represented by the Secretary of the Navy Application July 20, 1953, Serial No. 369,261

7 Claims. (Cl. 318—203)

(Granted under Title 35, U. S. Code (1952), sec. 266)

The invention described herein may be manufactured and used by or for the Government of the United States of America for governmental purposes without the payment of any royalties thereon or therefor.

This invention relates to a magnetic amplifier and more particularly pertains to a magnetic amplifier for controlling a two-phase induction motor.

The copending application of W. A. Geyger, Serial No. 276,027, filed March 11, 1952, discloses a push-pull full-wave magnetic amplifier which applies a pulsating unidirectional voltage to the control field winding of a two-phase reversible motor, which unidirectional voltage contains an A.-C. component correlative in amplitude and phase with the amplitude and polarity of the control voltage applied to the magnetic amplifier and a D.-C. component which introduces effective dynamic braking of the motor around the null point. Such an amplifier, however, is not suitable for controlling those types of low-inertia servomotors having lightweight rotors since the unidirectional signal applied to the control field winding, under zero control signal conditions, contains a high-level second harmonic frequency component which causes the rotor to oscillate.

The present invention relates to a magnetic amplifier for effecting the phase-reversible operation of a two-phase induction motor and for applying a D.-C. damping current to the motor, which magnetic amplifier is particularly adapted for use with those two-phase induction motors having low inertia, and preferably with those motors which can be operated by a voltage which is low as compared to the power supply voltage. In accordance with the present invention, a phase shifting impedance is connected between both field windings of a two-phase induction motor and a half-wave push-pull operated magnetic amplifier is connected to the phase shifting impedance and to the motor field windings in such a manner that under zero control signal conditions, equal amplitude half-wave current pulses are applied to each of the windings of the induction motor and no current flows through the phase shifting impedance. Consequently, under zero control signal conditions, the phase of the A.-C. components of the currents flowing through both field windings of the motor is the same, and there is no motor torque. The D.-C. component of the half-wave current pulses flowing through the field windings of the motor produces electrical damping of the motor.

When a control signal is applied to the magnetic amplifier, the amplitude of the half-wave current pulses applied to the field windings of the motor are differentially varied, and a current flows through the phase shifting impedance in a direction and amplitude dependent upon the sense of the difference in the amplitude of the pulses. The current flowing through one field winding of the motor will therefore contain a component which is shifted in phase from the A.-C. component of the current flowing through the other field winding, and thereby produce motor torque.

The voltage appearing across the phase shifting impedance contains an A.-C. component of the power supply frequency, and a D.-C. component correlative with the amplitude and polarity of the control signal applied to the magnetic amplifier. In accordance with the present invention, provision is made for utilizing the D.-C. component of this voltage to produce derivative feedback, provision also being made for compensating for the loss in gain due to the degenerative feedback effect of the derivative feedback loop.

An important object of this invention is to provide a magnetic amplifier control circuit for a two-phase induction motor, which circuit effects phase reversible operation of the motor and also applies a D.-C. current to the motor to thereby effect dynamic braking of the motor.

Another object of this invention is to provide error rate damping in a magnetic amplifier control circuit for a two-phase induction motor by the provision of a derivative feedback loop.

Yet another object of this invention is to compensate for the degenerative feedback in a magnetic amplifier circuit for a two-phase induction motor employing a derivative feedback loop.

Other objects and many of the attendant advantages of this invention will be readily appreciated as the same becomes better understood by reference to the following detailed description when considered in connection with the accompanying drawings wherein:

Fig. 1 is a schematic diagram of a magnetic amplifier motor control circuit in accordance with the present invention; and Fig. 2 is a schematic diagram of a two stage magnetic amplifier motor control circuit having error rate damping.

Referring more specifically to Fig. 1, there is illustrated a magnetic amplifier employing a pair of cores 10 and 12 each having controlled windings 14 and 16, bias windings 18 and 20 and control windings 22 and 24 wound thereon. As is conventional, cores 10 and 12 are formed of saturable magnetic material preferably having rectangular hysteresis loop characteristics.

The magnetic amplifier is arranged to control a two-phase induction motor 26 having field windings 28 and 30. Both of the field windings 28 and 30 of the motor 26 have one end thereof connected to a source of A.-C. potential 32, the other ends of the field windings being connected across a phase shifting impedance such as the capacitor 34.

In accordance with the present invention, half-wave current pulses having relative amplitudes correlative with the control signal applied to the magnetic amplifier are applied to the field windings 28 and 30. For this purpose, the A.-C. potential from the source 32 is applied through a unidirectional impedance element such as the dry-disk rectifier 36 and control winding 14 to the motor field winding 28, the A.-C. potential from source 32 also being applied through the unidirectional impedance 38 and control winding 16 to the motor field winding 30. The rectifiers 36 and 38 are phased so that current flows through the load windings 14 and 16 during the same half-cycle of the A.-C. potential from the source 32. When the reactances of the cores 10 and 12 are equal, the half-wave current pulses applied to the motor field windings 28 and 30 are equal, and no current flows through the phasing capacitor 34. Consequently, the A.-C. component of the currents flowing through motor windings 28 and 30 are in phase, and there is no motor torque.

Control windings 22 and 24 are connected in series with a resistance 40 and adapted to be connected to a source of control voltage such as 42. The control windings such as 22 and 24 are so arranged as to differentially vary the flux level of the cores 10 and 12, during the non-conducting half-cycle of the magnetic amplifier, in response to the application of either an A.-C. or D.-C. control voltage. Thus, when the control signal is other than zero, the flux levels preset in the cores 10 and 12 during the non-conducting half-cycle of the amplifier will be different, and consequently the cores will fire at different points during the succeeding conducting half-cycle of the amplifier. The half-wave current pulses applied through the motor windings 28 and 30 will thus differ in amplitude, and there will be a resultant current flowing through the phasing capacitor 34 in a direction dependent upon the sense of the difference in flux levels preset in the cores 10 and 12. The current flowing through one of the motor field windings such as 28 will thus contain an A.-C. component which is advanced phased relative to the A.-C. current flowing to the other field winding 30 when the polarity of the control voltage is such that the core 12 fires before core 10. In order to regulate the point during the conducting half-cycle the amplifier in which the cores 10 and 12 fire, the cores are preferably biased by suitable bias circuits such as is illustrated in Fig. 1. Bias winding 18 is energized from the A.-C. source 32 through the resistor 44, and bias winding 20 is energized from the source 32 through resistor 46, resistors 44 and 46 being adjusted so that under zero control signal conditions, the cores saturate at the desired point during the conducting half-cycle of the amplifier. Adjustment of the firing angles of the cores determines the level of the quiescent current which flows through the motor field windings and hence determines the level of the damping current. It is to be understood, however, that any other suitable bias circuit may be utilized in lieu of the full-wave bias circuit illustrated.

Fig. 2 illustrates a two-stage circuit employing a derivative feedback loop to achieve error rate damping and, therefore, further improvement of the servo mechanism performance. The output stage is similar to the amplifier illustrated in Fig. 1, and like numerals are utilized to designate similar elements. As in the preceding embodiment, motor field winding 28 is supplied with half-wave current pulses from the A.-C. source 32, through load winding 14 on core 10 and unidirectional impedance 36, the motor field winding 30 being supplied with half-wave current pulses from the source 32, through controlled winding 16 on core 12 and unidirectional impedance 38. A phasing capacitor 34 is connected between the ends of the motor field windings 28 and 30 and is arranged so that current flows through the phasing capacitor in a direction and amplitude dependent upon the sense of the unbalance in the reactances of cores 10 and 12.

The input stage comprises a pair of saturable reactor cores 50 and 52 having load windings 54 and 56 and control windings 58 and 60 wound thereon. Control windings 58 and 60 are connected in series with resistor 62, and are arranged so as to differentially vary the flux levels of the cores 50 and 52 in response to the application of either a D.-C. or amplitude modulated A.-C. voltage of the fundamental supply source frequency. The input stage circuit may conveniently be energized from the supply source 32, through a transformer 64, which transformer supplies half-wave current pulses to the load windings 54 and 56 of the input stage through unidirectional impedance elements 66 and 68 respectively. Control windings 70 and 72 of the output stage, are connected in series with the controlled windings 54 and 56, respectively, of the input stage, a balancing potentiometer 74 being provided to permit adjusting of the actual reactances of the cores 50 and 52 of the input stage. Under zero control signal conditions, half-wave current pulses flow through the control windings 70 and 72 of the output stage, and through the controlled windings 54 and 56 of the input stage, which current is referred to as the "quiescent" current of the input stage and serves to bias the output stage cores 10 and 12. The level of the quiescent current can be controlled, by proper selection of the resistance of the potentiometer 74 to obtain the desired reference flux level in the output stage cores 10 and 12. Alternatively, a separate output stage reference circuit may be utilized.

The polarity of the supply voltage applied to the input stage circuit is 180° out of phase with the polarity of the supply voltage applied to the output stage circuit, whereby the input stage is conducting during the non-conducting half-cycle of the output stage, and vice versa. Thus, control flux is established in the cores 10 and 12 during the non-conducting half-cycle of the output stage.

In order to provide error rate damping and thereby improve the stability of the amplifier, it is desirable to provide a derivative feedback loop. The voltage appearing across the phasing capacitor 34, in the output stage, is an amplitude modulated A.-C. voltage having a carrier frequency equal to the supply source frequency, and contains an A.-C. component correlative in amplitude and phase with the error signal, and a D.-C. component correlative in amplitude and polarity with the error or control signal applied to the input stage. Accordingly, negative feedback of the voltage appearing across the phasing capacitor 34, through a derivative network such as the condenser 76 and shunt resistor 78 to the derivative feedback windings 80 and 82 on cores 50 and 52 will produce degenerative feedback of the carrier frequency A.-C. component of the voltage across condenser 34, and derivative feedback of the D.-C. component of the voltage appearing across condenser 34, which derivative voltage corresponds to the rate of change of the error signal applied to the control winding of the input stage. In accordance with the present invention, compensation of the degenerative feedback effect produced by the derivative feedback loop can be effected by the provision of a regenerative feedback loop. For this purpose, the voltage across condenser 34 is also applied through a regenerative or a positive feedback loop comprising resistor 84 and regenerative feedback windings 86 and 88 on cores 50 and 52 respectively. In this manner the stability of the amplifier is increased without the consequent loss in gain due to the degenerative feedback effect of the derivative feedback loop.

It is deemed apparent that other derivative feedback networks may be utilized. Further, by proper choice of the number of turns of the derivative feedback windings 80 and 82, it is possible to utilize the phasing capacitor 34 to obtain derivative feedback effects, by merely connecting the derivative feedback windings 80 and 82 in series with the capacitor 34.

From the foregoing, it is apparent that the motor control circuit illustrated in Figs. 1 and 2 achieves phase reversible operation of the motor and in addition provides a D.-C. damping current to the motor which is effective in the vicinity of the null point to aid in stabilizing the motor. In addition, since the half-wave current pulses are simultaneously applied to both field windings of the motor, and since the amplitudes of the half-wave current pulses are equal under zero control signal conditions, the A.-C. component of the currents flowing to the motor field windings are in phase, and there is consequently no motor torque whereby the rotor of the motor does not oscillate. This circuit is accordingly particularly adapted for use with those types of two-phase induction motors having low inertia or light weight rotors. However, since the motor windings are energized from the power supply source through the controlled windings of the output stage, it is apparent that the voltage applied to the amplifier must be greater than that voltage necessary to drive the motor. With low voltage motors, this presents no problem. However, with high voltage motors, it is necessary to provide a step-up transformer in order to apply the proper voltage to the output stage of the magnetic amplifier.

It is additionally apparent that the output voltage appearing across the phasing capacitor may be utilized to provide derivative feedback, provided a regenerative feedback loop is also utilized to compensate for the degenerative feedback effect of the derivative feedback loop.

Obviously many modifications and variations are possible in the light of the above teachings. It is therefore to be understood that within the scope of the appended claims the invention may be practiced otherwise than as specifically described.

What is claimed as new and desired to be secured by Letters Patent of the United States is:

1. A control circuit for a two-phase induction motor having a pair of field windings comprising means connecting one end of each of said motor windings together, a phase shifting reactance connected to the other ends of said motor windings, a pair of cores of saturable magnetic material each having a controlled winding and a control winding thereon, a source of A.-C. current, means including said controlled windings and unidirectional impedance elements in series with said controlled windings for applying half-wave current pulses to said motor windings during the same half cycle of A.-C. supply source, and means including said control windings for differentially varying the firing angles of said cores.

2. A magnetic amplifier control circuit for a two-phase induction motor having first and second field windings comprising a pair of cores of saturable magnetic material, a control winding and a controlled winding on each of said cores, a source of A.-C. potential, a first branch circuit including said first motor winding and one of said controlled windings, a second branch circuit including said second motor winding and the other of said controlled windings, said A.-C. potential source being connected to said first and second branch circuits, unidirectional impedance elements in each of said branch circuits arranged so that half-wave current pulses flow through each of said motor windings on the same half-cycle of said A.-C. potential, a phase shifting impedance connected in parallel with said motor windings, and means including said control windings for differentially varying the firing angles of said cores.

3. The combination of claim 2 including means for biasing said cores to adjust the level of the quiescent current flowing through the motor field windings.

4. A magnetic amplifier control circuit for a two-phase induction motor having first and second field windings comprising a pair of cores of saturable magnetic material, a control winding and a controlled winding on each of said cores, a source of A.-C. potential, a first branch circuit including said first motor winding and one of said controlled windings, a second branch circuit including said second motor winding and the other of said controlled windings, said A.-C. potential source being connected to said first and second branch circuits, unidirectional impedance elements in each of said branch circuits arranged so that half-wave current pulses flow through each of said motor windings on the same half-cycle of said A.-C. potential, a phase shifting impedance connected in parallel with said motor windings, means including said control windings for differentially varying the firing angles of said cores, and means including a derivative feedback network for applying negative feedback to said magnetic amplifier correlative with the time rate of change of the modulation envelope of the voltage across said phase shifting impedance.

5. A magnetic amplifier control circuit for a two-phase induction motor having first and second field windings comprising a pair of cores of saturable magnetic material, a control winding and a controlled winding on each of said cores, a source of A.-C. potential, a first branch circuit including said first motor winding and one of said controlled windings, a second branch circuit including said second motor winding and the other of said controlled windings, said A.-C. potential source being connected to said first and second branch circuits, unidirectional impedance elements in each of said branch circuits arranged so that half-wave current pulses flow through each of said motor windings on the same half-cycle of said A.-C. potential, a phase shifting impedance connected in parallel with said motor windings, a first feedback means including a derivative network responsive to the voltage across said phase shifting impedance for applying negative feedback to said magnetic amplifier, and a second feedback means responsive to the voltage across said phase shifting impedance for applying regenerative feedback to said magnetic amplifier.

6. The combination of claim 5 wherein said magnetic amplifier includes an input stage circuit having a pair of cores, regenerative and degenerative feedback windings on said input stage cores, said first feedback means including said degenerative feedback windings, said second feedback means including said regenerative feedback windings.

7. The combination of claim 6 wherein said derivative network includes a condenser in series with said degenerative feedback windings.

No references cited.